United States Patent [19]

Bosse et al.

[11] Patent Number: 4,875,652

[45] Date of Patent: Oct. 24, 1989

[54] OIL SQUIRT WITH WALL HOLDER

[76] Inventors: Gerhard R. Bosse, Waldweg 11, 2000 Oststeinbek 2; Michael Lienow, Jahnstrasse 64, 2085 Quickborn; Bernt Spiegel, Saarburger Ring 10 - 12, 6800 Mannheim 71; Bernd O. Kruse, Ludwigsteinstr. 63, 3430 Witzenhausen 6, all of Fed. Rep. of Germany

[21] Appl. No.: 313,494

[22] Filed: Feb. 22, 1989

[30] Foreign Application Priority Data

Feb. 29, 1988 [DE] Fed. Rep. of Germany ....... 8802650
Oct. 26, 1988 [DE] Fed. Rep. of Germany ....... 8813422

[51] Int. Cl.$^4$ .......... B65D 25/00; B67D 5/00; F01M 11/00
[52] U.S. Cl. .................. 248/311.2; 248/310; 239/283; 184/105.1; 220/18; 222/173
[58] Field of Search .............. 220/85 H, 85 SP, 18; 222/179.5, 173; 184/105.1; 248/311.2, 310; 239/282, 283, 355

[56] References Cited

U.S. PATENT DOCUMENTS

| 1,138,794 | 5/1915 | Rydquist | 222/173 |
| 1,584,857 | 5/1926 | Hobbs | 248/311.2 |
| 1,810,826 | 6/1931 | Gray | 222/173 |
| 2,992,804 | 7/1961 | Doran | 248/311.2 |
| 3,033,404 | 5/1962 | Adell | 248/311.2 |
| 4,664,301 | 5/1987 | Hoyt | 220/85 SP |

FOREIGN PATENT DOCUMENTS 15244 of 1898 United Kingdom .................. 221/32

Primary Examiner—Henry A. Bennet
Assistant Examiner—Denise L. Ferensic
Attorney, Agent, or Firm—Larson and Taylor

[57] ABSTRACT

An oil squirt (10) mountable to a wall holder in a predetermined supporting position exhibits an elastically bendable nose (24,28). A closure cap (64) is firmly fixed or releasably clamped to the wall holder (16) at the point (at 38) where the nose tip (24) is located in the supporting position of the oil squirt. In the supporting position, the closure cap (64) seals the opening in the nose tip (24) of the oil squirt (10). Upon removal of the oil squirt (10) from the wall holder (16), the closure cap can remain thereon.

10 Claims, 2 Drawing Sheets

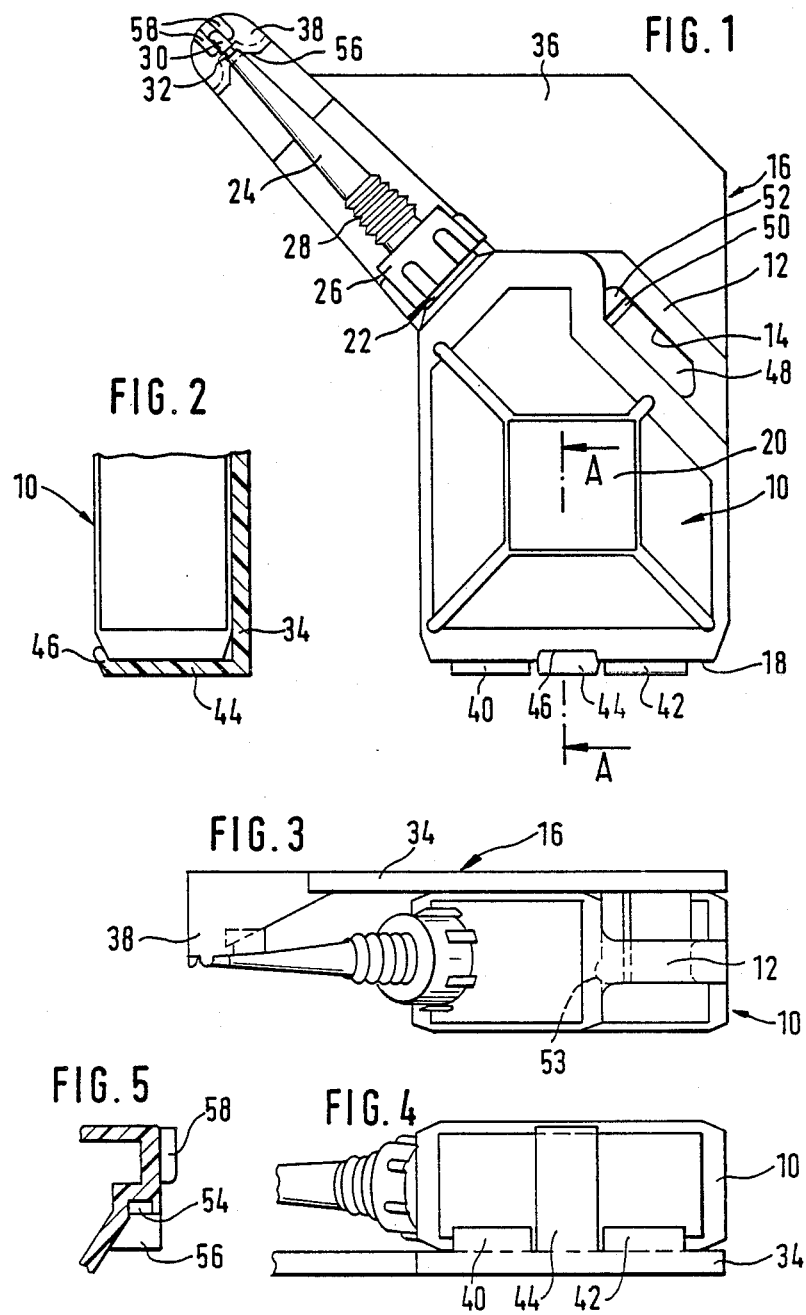

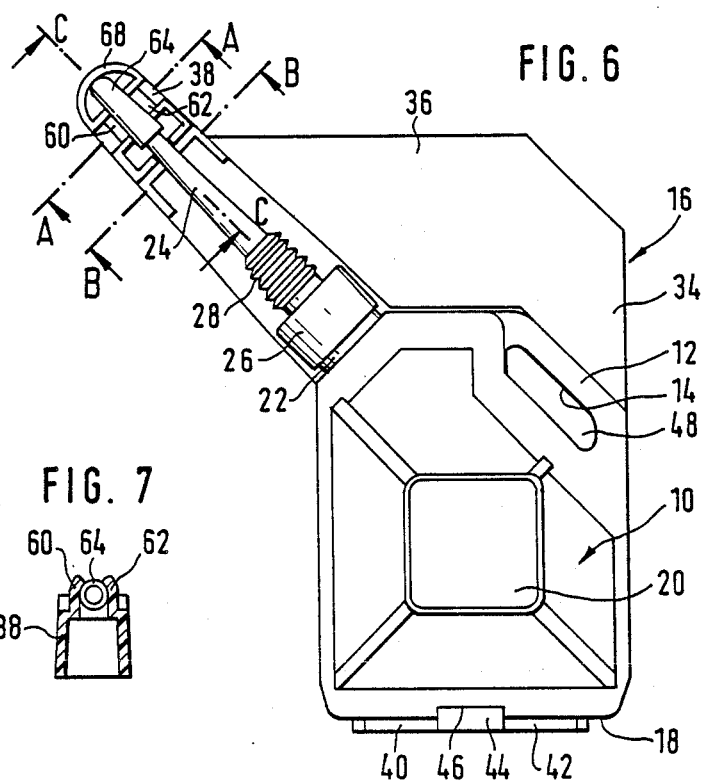
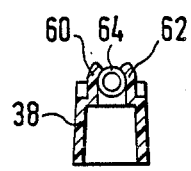
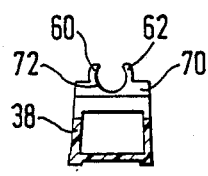
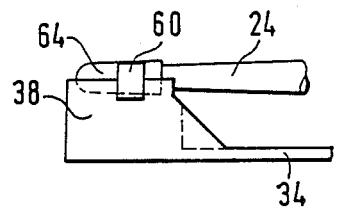
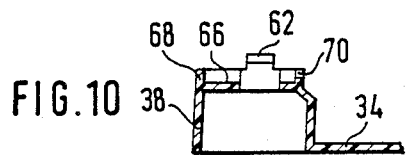

OIL SQUIRT WITH WALL HOLDER

The present invention is concerned with an oil squirt exhibiting a resiliently bendable nose and being attached to a wall holder in a predetermined supporting position.

Hitherto, oil squirts, normally, have been laid down on a rack or in a drawer. To prevent oil from leaking a closure cap is provided on the nose opening that can easily go astray or, if firmly connected, through a band, to the oil squirt, will hamper handling thereof. Moreover, one's fingers will become stained. Precautionarily, one will try to put or lay down the oil squirt in a manner that the nose tip points upwardly to prevent oil from leaking not only if no closure cap is provided but even in the presence of such a cap. However, in the majority of cases, a holder must be improvised which is capable to keep the oil squirt in the desired upright position.

It is the object of the present invention to provide a well matched combination of oil squirt and wall holder which facilitates the handling of the oil squirt and, in a simple manner, precludes leakage of oil in the laid-down condition.

The afore-described problem, in the practice of the invention, will be solved in that a closure cap is provided on the wall holder at the point where the nose tip is located in the supporting position of the oil squirt to close the nose tip of the oil squirt, from which closure cap the nose tip is withdrawable when removing the oil squirt from the wall holder.

The invention provides that the closing of the oil squirt becomes a secondary effect of its being laid down. As the opening on the nose tip will already be closed by the movement of the hand required for fixing the oil squirt to the wall holder, the handling will be simplified thereby preventing the fingers from becoming stained.

This advantage will already be attained by a simple embodiment of the invention wherein the closure cap is formed by a blind hole in the wall holder, i.e. it is non-detachably secured thereto. However, conversely, it has been found that in practice, in a large number of cases, it cannot be done without a closure cap. An oil squirt after having been removed from the wall holder, frequently, is used at different locations, transported between such locations and is put or laid down and no oil is allowed to leak during transportion or in the laid-down position. To achieve this by maintaining the aforedescribed basic advantages, it is suggested according to a preferred embodiment of the invention that the wall holder, at the point at which is located, in the supporting position of the oil squirt, the nose tip, exhibits a clamp holding a closure cap mountable on the nose tip, in force-locking but detachable manner.

In the event that in this preferred form of embodiment the oil squirt only temporarily is removed from the holder, the cap may continue to remain clamped to the wall holder. After use, the oil squirt simply can be re-mounted to the wall holder and, at the same time, the nose tip may be introduced into the closure cap held in clamped condition. In this case, the afore-mentioned simple handling will be insured. In particular, it is advantageous that there will be no need for one's hands to become stained in removing and re-mounting the closure cap. It cannot go astray in such temporary applications of the oil squirt because it remains on the wall holder.

If, conversely, the oil squirt is to be removed from the wall holder for an extended period of use and transportation, if any, the closure cap, at the same time, can also be removed from the clamp, with the nose serving as a lever. The oil squirt safely closed by the closure cap can then be laid down or transported in any desired position. After use, when mounting the oil squirt on the wall holder, the closure cap will re-enter the clamp.

In a preferred practical form of embodiment of the invention, the clamp comprises two clamping yaws molded or secured to the wall holder, with the space and shape thereof being so selected that the closure cap, through movement transverse of their longitudinal axis, is engageable and disengageable, respectively, between the clamping yaws. The clamping yaws are, preferably, extending essentially normal to the fixing plane of the wall holder. In the event of a substantially plate-shaped wall holder, the clamping yaws extending normal to the wall so that not only the oil squirt but also the closure cap, through a movement normal to the wall, can engage the wall holder to be thereby fixed.

If the oil squirt is removed from the wall holder only temporarily in which case the closure cap continues to remain clamped on the wall holder, the same situation as in the embodiment exhibiting a blind hole in the wall holder should arise, preferably, for the removal of the oil squirt and its renewed fixation to the wall holder. For that purpose it is provided according to another preferred embodiment of the invention to locate, in the supporting position, at least next to the one axial end of the closure cap, a stop locking the closure cap, in the clamping position, against axial displacement. Preferably, two stops hold the clamped closure cap in either direction against axial displacement, with one of the stops, at the same time, also being capable to form a support face for the nose. The other stop holds the closure cap, feasibly, in an axial position such that, in the supporting position of the oil squirt, it is firmly forced, in the axial direction, to the nose tip.

A particularly safe closure of the opening in the nose tip is attained in that, in the supporting position, through a flexible material of the oil squirt or of the wall holder, the nose tip, with the opening thereof, is forced against the bottom of the blind hole and the clamped closure cap, respectively. This can be enhanced by another preferred feature according to which the nose exhibits a bellow-type area insuring not only a desired flexibility of the nose but also the elastic resiliency in the longitudinal direction.

Two forms of embodiment of the invention will now be described in closer detail with reference to the drawings, wherein FIG. 1 is a side view of an oil squirt secured to a wall holder;

FIG. 2 is a partial section along the section line A—A in FIG. 1;

FIG. 3 is a plan view of the combined unit of oil squirt and wall holder according to FIG. 1;

FIG. 4 is a view from the bottom of the oil squirt fixed to the wall holder;

FIG. 5 is a cross-sectional view of the area of the wall holder intended for accommodating the nose tip of the oil squirt;

FIG. 6 is a side view of an oil squirt fixed to a wall holder modified as compared with FIG. 1;

FIG. 7 is a partial section along the sectional line A—A according to FIG. 6;

FIG. 8 is a partial section along sectional line B—B in FIG. 6 with the oil squirt removed;

FIG. 9 is a side view of the area of the wall holder according to FIG. 6, holding the nose tip of the oil squirt;

FIG. 10 is a partial longitudinal section along the sectional line C—C in FIG. 6.

The oil squirt as shown in the drawings and generally designated by numeral 10, substantially has the shape of a small-sized oil can as commonly used for accommodating engine oil. The width of the oil squirt can be, for example, about 6 cm, the height about 7.5 cm and the depth about 2.5 cm. The two upper corners are bevelled. The bevelled corner which, in FIG. 1, is the right-hand one, is shaped as an integrally formed handle 12 which, at an angle of about 45°, obliquely extends to the vertical side faces. The handle 12, in small-sized dimensions, can, of course, not serve as a handle. However, it defines an elongated grip-through orifice 14 suitably used for securing the oil squirt 10 to a matching wall holder 16.

The substantially block-shaped outer configuration of the oil squirt 10 exhibiting a planar bottom face 18 is also well suited for placement in upright position.

Moreover, the planar front face offers space for a legend field 20.

At the upper corner which is the left-hand corner in FIG. 1, the container of the oil squirt 10 exhibits a circular opening in the form of a tube nozzle 22 provided with external thread. Screwed thereon is a nose 24 formed with an internal cannula, including a matching internal thread. The thread portion of the nose 24 can be formed generally integrally therewith. However, in the example of embodiment, a sleeve nut 26 is used in place by way of which—as is otherwise common practice in connections by sleeve nuts—the inner end of the nose 24 is firmly and closely tightened against the tube nozzle 22. The configuration of the thread portion in the form of the sleeve nut 26 separated from the nose 24 offers the advantage that the same can be made of a plastic material differing in colour from that of the nose 24. The container of the oil squirt 10, equally, is preferably made of plastics, viz. of a transparent material such that the level of filling is externally visible.

In the embodiment as shown by way of example, the nose 24, in the vicinity of the sleeve nut 26, exhibits a bellow-type area 28 enhancing the flexibility of the nose 24 and insuring a certain elasticity of the nose in the longitudinal direction.

The oil squirts, normally, are sold together with the oil filling. In this initial condition, the outer end 30 of the nose 24 marked by an annular groove 32 is closely sealed. When putting into use the oil squirt, the extreme end 30 of the nose 24, at the annular groove 32, is cut off thereby opening the cannula of the nose, with the latter protruding upwardly relative to the vertical side faces of the container of the oil squirt at an angle of 45°; however, thanks to the bellow-type area 28 it can be easily bent to another direction.

The wall holder 16 is made of a planar base plate 34 of plastic material formed, for example, with three bolt holes with the aid of which the wall holder is mountable to a wall. A plurality of projections molded to the base plate 34 serve to fix the oil squirt 10. In the lower area, the outer contour of the wall holder 16 conforms to the contour of the oil squirt. However, the base plate 34 upwardly projects to form there another legend field 36. At the same time, the upwardly projecting area 36 stabilizes a projection 38 engaging the nose tip.

Three other projections 40, 42, and 44 provided at the bottom edge of the wall holder 16 form a planar supporting face which, in clamped condition, supports the bottom face 18 of the oil squirt 10. The flat projections 40 and 42 are relatively short so that, externally, they are hardly visible; it is only the equally flat and relatively narrow projection 44 located between the two projections 40 and 42 that extends throughout the depth of the oil squirt 10 and that is configured, at the free end thereof, with an upwardly projecting nose 46 straddling the bottom front edge of the oil squirt to hold the same with a rear wall in abutment with the base plate 34 of the wall holder 16.

Another projection 48 on the base plate 34 is configured and disposed such that it fits into the passage opening 14 of the oil squirt 10 once the latter is in the desired position on the projections 40, 42, 44.

The projection 48, near the upper end thereof, is provided with a transverse slot 50 extending down to the base plate 34. Through the said transverse slot 50, a spring tongue 52 is formed from the uppermost end of the projection 48 straddling by a nose-type projection 53 shown in broken lines in FIG. 3 the front edge of the handle 12 thereby equally reliably holding the oil squirt 10 with the rear side thereof on the base plate 34.

The projection 38 is formed, as is best shown in FIG. 5, with a blind hole 54 into which can be introduced, after the outer end 30 having been cut off, the tip of the nose 24 now open. The dimensions of the blind hole 54 and of the nose 24 are matching such that, on the one hand, the diameters go together and, on the other hand, the nose tip, thanks to the elastic material of the oil squirt 10 and of the nose 24, with the bellow-type area 28 thereof, is resiliently forced against the bottom of the blind hole 54 whereas the oil squirt takes the position on the wall holder 16 as shown in the drawing wherein it is held through the projections 40, 42, 44 and 48, 52 as well as by noses 46 and 53.

Axially ahead of the blind hole 54, projection 38 is formed with an area of introduction 56 of funnel-type configuration or is provided on either side with bevelling faces, respectively, to facilitate the introduction of the nose tip into the blind hole 54. The inlet area 56 not only axially but rather also laterally is open to the front.

As long as the outer end of the nose 24 has not yet been cut off, i.e. as long as it is in the ready-for-sale condition, the nose 24 is not yet held through the blind hole 54. This will not be necessary because the cannula in the nose 24 is still closely sealed. In that condition, the end 30 of the nose 24 is in an abutment with a support face on the projection 38 on the outer side of the blind hold 54, with a lateral support of the nose end 30 through two ribs 58 being suitably provided.

The embodiment according to FIGS. 6–10 distinguishes only by the absence of the transverse slot 50 and the projection 53 as well as by the design of the wall holder 16 and of the oil squirt 10 in the area of the nose end from the embodiment according to FIGS. 1–5.

According to FIGS. 6 to 10, the projection 38 over the base plate 34 forms an elevation to which are moulded two clamping yaws 60, 62. The space thereof is so selected that the closure cap 30 seated on the nose 24 can be engaged between the clamping yaws provided with an undercut, as is shown in FIGS. 6, 7 and 9.

To lock a closure cap 64 seated from the very start detachably on the open end of the nose 24, against axial displacement, the end wall of the projection 38, over a bearing surface of the closure cap 64 designated by numeral 66 in FIG. 10, is drawn upwardly thereby forming an external stop 68. Similarly, on the other side of the closure cap 64, another stop 70 is drawn upwardly over the bearing face 66 which stop 70 is formed with a groove 72 representing a support face for the nose. If the nose 24, when removing the oil squirt 10 from the wall holder 16, is withdrawn from the closure cap 64 continually held in clamped condition, the stop 70 will prevent the closure cap 64 from being axially withdrawn from the clamp 60,62. Once the nose 24, when re-mounting the oil squirt to the wall holder, is subsequently re-introduced into the closure cap 64, the stop 68 precludes the closure cap 64 from axially escaping. The stop 68 is so located that the closure cap 64, in the supporting position as shown in FIG. 6 is forced relatively firmly and, hence, tightly onto the tip of the nose 24.

Once the oil squirt 10 along with the closure cap 64 is to be removed from the wall holder 16, first, again by loosening nose 46, the container of the oil squirt is released and disengaged from the projection 48. However, in that case, it is not the nose 24 that is withdrawn, in axial direction, from the closure cap, but rather the container of the oil squirt that is further removed from the base plate 24; feasibly, the fingers at the same time grip under the elastically flexible nose 24 thereby withdrawing the closure cap 64 from the clamp 60, 62. In addition, there is, of course, another alternative residing in that, by gripping under the nose 24, first the closure cap 64 is withdrawn from the clamp 60,62 and thereafter, by forcing back the nose 46, the container of the oil squirt is removed from the wall holder.

In general, the new oil squirt along with the wall holder according to FIGS. 6-10, hence, for the first time offers the capability of retaining a closure cap in a manner selectively non-detachable on the wall holder to permit, with a flick of the wrist, immediate use of the oil squirt already opened or removal of the closure cap 64 along with the oil squirt from the wall holder once it is desired to keep the same closed also in removed condition.

We claim:

1. An oil squirt mountable, in a predetermined supporting position, to a wall holder and provided with a flexibly bendable nose, characterized in that provided on the wall holder (16) at the point (at 38) where the nose tip (24) is located in the supporting position of the oil squirt (10), is a closure cap (38,54;64) sealing the nose tip (24) of the oil squirt (10), from which cap the nose tip (24) is withdrawable when removing the oil squirt (10) from the wall holder (16).

2. An oil squirt combined with a wall holder as defined in claim 1, characterized in that the closure cap is formed by a blind hole (54) in the wall holder (16).

3. An oil squirt combined with a wall holder as defined in claim 2, characterized in that an essentially funnel-shaped inlet area (56) follows the opening of the blind hole (54), which inlet area is open on the side from which the oil squirt (10) is advanced for fixation to the wall holder (16).

4. An oil squirt combined with a wall holder as defined in claim 1, characterized in that the wall holder (26) at the point (at 38) where the nose tip (24) is in the supporting position of the oil squirt (10), exhibits a clamp (60,62) holding a closure cap (64) mountable to the nose tip (24) in force-locking but detachable manner.

5. An oil squirt combined with a wall holder according to claim 1, characterized in that the nose (24) exhibits a bellow-type area (28).

6. An oil squirt combined with a wall holder according to claim 1, characterized in that the oil squirt (10), in small-sized format, has the shape of an oil can stretching the nose (24) obliquely upwardly and, in side view, being of a substantially square configuration, including an integrally formed handle (12) and a grip-through orifice (14) in which engages the wall holder (16) with a projection (48,52,53).

7. An oil squirt combined with a wall holder according to claim 6, characterized in that the wall holder (16) is provided with at least one support face (40,42,44) supporting the oil squirt (10) in the bottom area, which support face exhibits a nose (46) straddling the lower edge of the oil squirt (10), with the supporting face (40,42,44), in the area of the nose (46) being formed on a projection (44) springing in a direction from the tip thereof.

8. An oil squirt combined with a wall holder according to claim 4, characterized in that the clamp comprises two clamping yaws (60,62) provided on the wall holder (16), with the space and shape thereof being so selected that the closure cap (64), through movement transverse of the longitudinal axis thereof is engageable or disengageable between the clamping yaws.

9. An oil squirt combined with a wall holder according to claim 8, characterized in that, in the supporting position, at least next to the one axial end of the closure cap (64), a stop (68,70) is provided for locking the closure cap in the clamped position against axial displacement.

10. An oil squirt combined with a wall holder according to claim 9, characterized in that a stop (68) for locking the closure cap (64) against axial displacement holds the closure cap in such an axial position that, in the supporting position of the oil squirt (10), axially, it is firmly forced onto the nose tip (24).

* * * * *